Oct. 18, 1966    R. J. GRAVES    3,279,666
MOVIE FILM ADVANCE SYSTEM
Filed Aug. 24, 1964    2 Sheets-Sheet 1
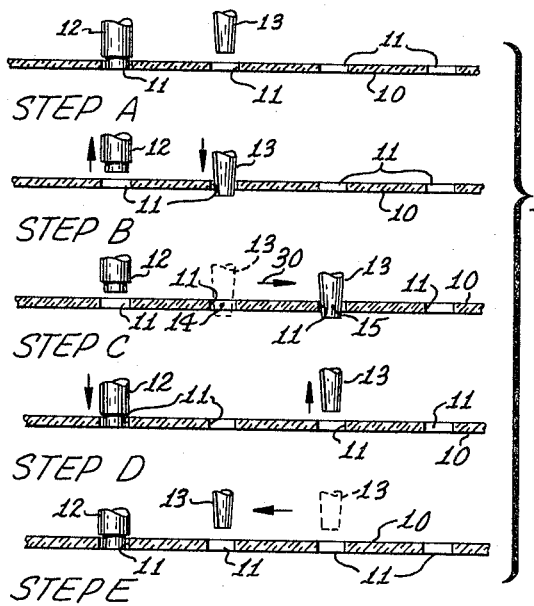
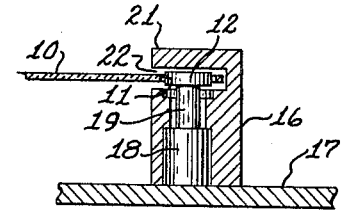
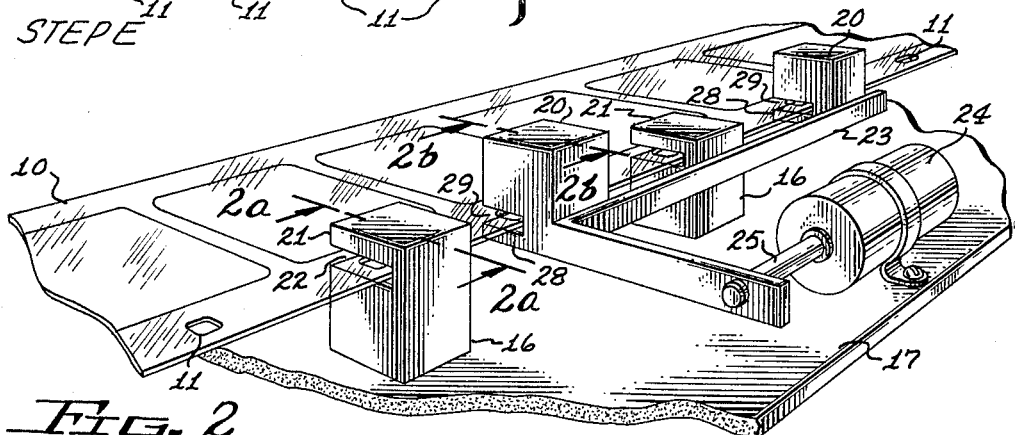
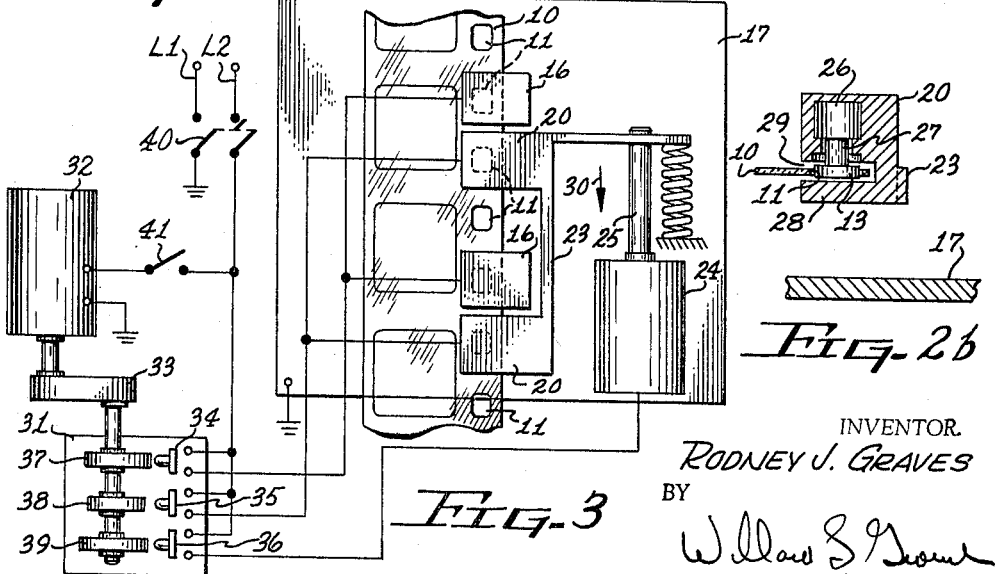
INVENTOR.
RODNEY J. GRAVES
BY
Willard S. Brown
ATTORNEY Oct. 18, 1966    R. J. GRAVES    3,279,666
MOVIE FILM ADVANCE SYSTEM
Filed Aug. 24, 1964    2 Sheets-Sheet 2
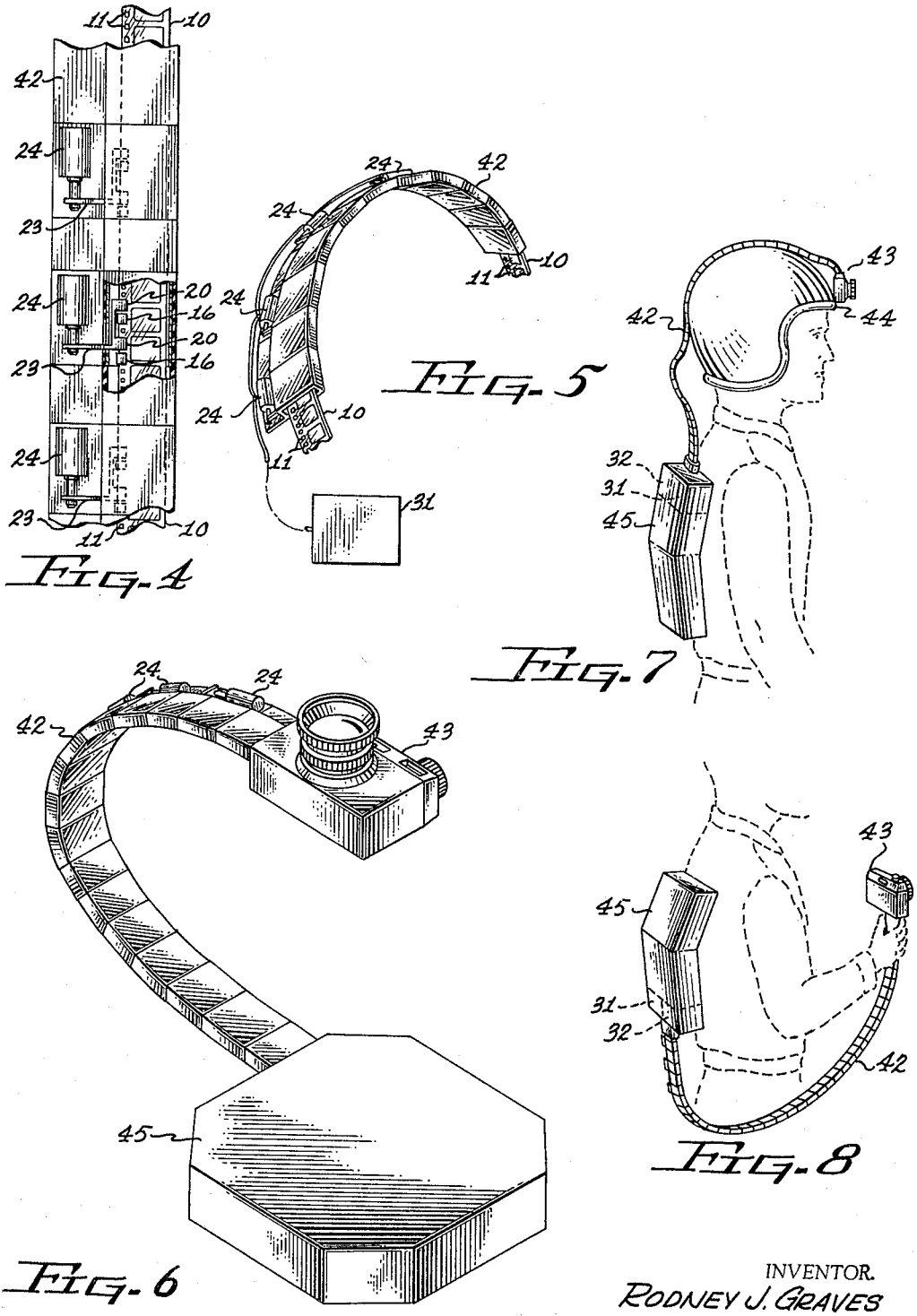
INVENTOR.
RODNEY J. GRAVES
BY
Willard S. George
ATTORNEY 3,279,666
MOVIE FILM ADVANCE SYSTEM
Rodney J. Graves, 2629 Portland St., Los Angeles, Calif.
Filed Aug. 24, 1964, Ser. No. 391,570
3 Claims. (Cl. 226—67)

This invention is directed to a movie film advance system and is more particularly directed to a solenoid actuated intermittent film advance system and apparatus.

Present day film advance systems use standard pin and claw movements, which are driven by the rotary motion of electric motors. The principle of motion pictures is found in intermittent movement. Therefore, revolving motion must be transformed to intermittent motion. This practice involves machinery of considerable size, weight and complexity.

One of the objects of this invention is in motion picture equipment utilizing a film advance system in which the origin of motion is intermittent itself so that it will find a wider range of capabilities and applications due to the reduction of size, weight and rigidity.

Another object is to design a solenoid motivated film advance system, the thrust of the solenoid shaft being used to activate the registration and claw pins and also to travel the film forward.

A further object is to provide a single solenoid advance unit which has the advantage of being compact and light so that the units may be set in a series with hinged connections to make a flexible chain and thus a flexible film transport since the units are driven electrically and may be maintained in synchronized phase relationship by common connections with a main distributor.

And it is a further object in a movie film advance system to provide the magazine holding the film independent of the gate and lens component, the magazine being carried on a man's back, while the lens and gate may be mounted on a helmet or held like a gun in one hand.

Further features and advantages of this invention will appear from a detailed description of the drawings in which:

FIG. 1 is a diagram showing the law and pin elements for intermittently advancing movies film.

FIG. 2 is a perspective view of one self-contained solenoid film advance unit incorporating the features of this invention.

FIG. 3 is a control circuit diagram for the apparatus shown in FIG. 2.

FIG. 4 is an enlarged fragmentary view of a flexible film transport incorporating the features of this invention.

FIG. 5 is a perspective view showing a flexible film transport utilizing a series of solenoid film advance units of this invention.

FIG. 6 is an enlarged fragmentary perspective view of a portable camera arrangement.

FIG. 7 is a side view of the apparatus of FIG. 6 being worn by a person with the camera on his head.

FIG. 8 is still another view showing the camera of FIG. 7 arranged for hand holding.

Motion picture film 10 is designed with a series of sprocket holes 11 spaced at even intervals either on one or both sides of the strip, the purpose being to secure exact travel distances frame to frame and also to stabilize the film 10 during the time of projection or exposure.

Machinery in use today for taking or showing motion pictures is designed to perform the two functions mentioned above with speed and accuracy. The mechanical pattern of movement is essentially uniform, although there exist many variations in the design of the equipment now in use. The primary function of any machinery is to advance the film one frame and hold it in a still position during projection or exposure. This is the cycle which must be executed twenty-four times each second to create the illusion of normal movement.

The above basic movement cycle is illustrated in FIG. 1 as characteristic of all present motion picture devices in which there is shown the registration pin 12 and the advancing claw 13. The cycle of operation is shown by reference to steps A to E of FIG. 1.

In step "A" both the pin 12 and claw 13 are at rest.

In step "B" the pin retracts from the film sprocket hole 11 and the claw moves into a sprocket hole.

In step "C" the pin 12 remains retracted as the claw 13 moves to advance the film to the next frame as indicated by arrow 30, moving from the broken line position 14 to the full line position 15.

In step "D" the pin inserts in the next sprocket hole 11 and the claw 13 withdraws from the film sprocket hole.

Finally, in step "E" the registration pin 12 remains inserted in the film and the claw 13 retracts back to the position shown in "A" to complete the cycle.

In FIGS. 2 and 3 is shown an arrangement wherein the above described sequence of operation of the registration pin 12 and film advance claw 13 by solenoid actuated devices. To this end there is provided one or more registration pin actuating solenoid units 16 suitably fixed to the main frame 17 of a movie camera, projector or the like, each of which contains a solenoid coil 18 having an armature 19 to the outer end of which is fixed the registration pin 12.

Energizing the solenoid 18 inserts the registration pin into a sprocket hole 11 while deenergizing the solenoid 18 causes withdrawal under spring return of the registration pin from the sprocket hole. A suitable backup guide plate 21 is provided to form a guide slot 22 through which the film is guided.

One or more claw units 20 are fixed on a claw carriage 23 suitably reciprocatably mounted on the main frame 17, the carriage being actuated by a film advance solenoid 24 fixed to the frame 17 having an armature 25 with its outer end suitably connected to the claw carriage so that by energizing the solenoid 24 the carriage and claw units may be reciprocated longitudinally in film advance direction of the film 10 to advance the film frame-by-frame. When solenoid 24 is deenergized the armature 25 and carriage 23 return under spring pressure to starting position.

Each of the claw units 20 include a claw solenoid coil 26 having an armature 27 to the outer end of which is fixed the film advance claw 13. A suitable backup guide plate 28 is formed on the claw unit to form a slot 29 through which the film 10 is advanced. When claw solenoid 26 is energized claw 13 is inserted into a film sprocket hole 11 against spring pressure, the claw being withdrawn when the solenoid 26 is deenergized.

In FIG. 3 is shown a wiring diagram and control apparatus suitable for operating the solenoid operated pin and claw devices in the proper cycle of operation. A source of power may be derived from the leads L1 and L2, with lead L1 grounded. A cam control switch 31 is driven from a suitable motor 32 connected through an appropriate gear reduction box 33. A series of switches 34, 35 and 36 actuated from cams 37, 38 and 39 respectively so as to energize solenoids 18, 24 and 26 in the desired timed sequence so as to operate the registration pin 12 and film advance claw 13 in the described manner of FIG. 1 whenever, with line switch 40 closed, the control switch 41 is closed.

It is to be understood, that while two sets of solenoids 18–26 are shown in use with the advance solenoid 24, only one set of solenoids 18–26 may be utilized. Further, as noted in FIG. 4, a whole series of solenoid units such as shown in FIG. 2 may be mounted on a flexible support or hose 42 and electrically interconnected in parallel to the drum control switch 31 so as to provide a highly flexible and universal film transport unit, such for example, as shown in FIG. 5. Such a structure particularly adapts itself to use of a camera lens-shutter component 43 at a remote location on the forehead 44 with the film magazines 45 and power unit 32 and control 31 at a remote location on the photographer's back. The flexible film transport hose may also be used with the camera component 43 in hand held arrangement as shown in FIG. 8.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A movie film advance system comprising in combination:
    A. a film magazine,
    B. a camera lens-shutter component remotely located relative to said film magazine,
    C. a flexible support connected between said film magazine and said camera lens-shutter component,
    D. and a series of solenoid actuated intermittent film advance units mounted on said flexible support and electrically interconnected so as to provide a highly flexible and universal positive film transport unit between said film magazine and said camera lens-shutter component.

2. A movie film advance system as set forth in claim 1 wherein said system includes a drum control switch electrically interconnecting said solenoid units in parallel for the controlled operation of said film advance units in said flexible transport unit.

3. A movie film advance system as set forth in claim 1 wherein said system includes a power unit mounted with said film magazine at a remote location from said camera lens-shutter component.

References Cited by the Examiner
UNITED STATES PATENTS

| | | | |
|---|---|---|---|
| 2,278,196 | 3/1942 | Fluharty | 226–67 X |
| 2,772,325 | 11/1956 | Gaite | 226—57 X |
| 2,890,619 | 6/1959 | Waller | 352—70 |

M. HENSON WOOD, JR., *Primary Examiner.*

C. H. SPADERNA, *Examiner.*

R. A. SCHACHER, *Assistant Examiner.*